March 10, 1959 G. I. WILLIAMS 2,877,451

DIODE SWITCHING CIRCUITS

Filed May 12, 1955 2 Sheets-Sheet 1

INVENTOR
GERALD I. WILLIAMS

BY Cushman, Darby & Cushman
ATTORNEYS

March 10, 1959 G. I. WILLIAMS 2,877,451
DIODE SWITCHING CIRCUITS
Filed May 12, 1955 2 Sheets-Sheet 2

INVENTOR
GERALD I. WILLIAMS
BY
Cushman, Darby & Cushman
ATTORNEYS 2,877,451

DIODE SWITCHING CIRCUITS

Gerald I. Williams, Roseville, Minn., assignor, by mesne assignments, to Sperry Rand Corporation, New York, N. Y., a corporation of Delaware Application May 12, 1955, Serial No. 507,809
11 Claims. (Cl. 340—174)

This invention relates to pulse controlling circuits and particularly to pulse switching circuits wherein electric pulses on a first line may be switched to appear on any one of a group of lines, or pulses on any one of said group of lines may be made to appear on said first line. More specifically, this invention deals with the switching of pulses by means of semi-conductor rectifier elements.

The ability to switch electric pulses from a single line to one of a multiplicity of lines or vice versa at speeds generally compatible with electronic equipment has been the subject of considerable research. Such switching has been performed for the most part either with electro-mechanical contacts at great sacrifice in speed or by vacuum tube circuits. The latter are necessarily complicated and in many cases defeat the purposes for which the switch is provided. For instance, where it is desired to generate a pulse on one of a group of lines, it may be more economical to provide a pulse generating means for each line rather than to use a single pulse generator together with a switch to apply its output to any one of said group of lines. However, if the switch is of economical construction and is reliable in operation, its use may well offer a great saving, not only in cost of manufacture but in lessened heat dissipation, bulk, and circuit complexity. To consider a specific example, electronic data handling systems require extensive data storage facilities such as offered by the magnetic drum, a description of which may be found in United States Patent No. 2,540,654, issued February 6, 1951, to A. A. Cohen et al. Most magnetic drums are equipped with a multiplicity of transducing heads, only one or a small fraction of which are in operation at any given instant. Accordingly, a great number of heads may share a single pulse forming circuit for writing information on the drum and/or a single reading amplifier for building up the relatively weak playback signals to usable amplitude. A further economy may be realized if the same switch is used for both writing and reading operations.

Semi-conductor rectifier elements as, for example, germanium diodes or varistors, are particularly useful in electronic switching applications. As conventionally used, a germanium diode when biased in one direction presents a very large resistance, whereas when biased in the opposite direction it acts as a conductor. However, in order to bias a diode to conduction, current must flow therethrough, and if a pulse opposite in polarity to that current must pass the diode in substantially unaltered condition, conventionally the amplitude of the biasing current equals or exceeds that of the pulse. Where large pulses of random polarity are to be switched by diodes in the conventional manner, the power drain required to operate the switch may become very substantial, especially in large scale data handling equipment.

Most semi-conductor rectifier elements exhibit a phenomeon which is variously referred to as diode enhancement, diode recovery or the hole-storage effect. The term "enhancement" will be used generically hereinafter. In the treatment of enhancement in the literature, the phenomenon has been considered to be troublesome and discussion has centered on its elimination or circumvention. For example, diode enhancement has often been cited as a major frequency limiting factor in diode circumstances, particularly those using junction type diodes.

In accordance with the present invention, the enhancement phenomenon is beneficially utilized to provide for control and switching of pulses which may be of greater current amplitude than those switchable in any known manner. The nature of a semi-conductor rectifier element demonstrating the enhancement phenomenon is that after a forward bias voltage has been applied across the element, and therefore a forward bias current has been flowing therethrough, reversal of the applied voltage finds the back resistance of the element low until a time period measured in microseconds or fractions of microseconds has passed. During this time a current will flow through the element in the so-called reverse direction. However, near the end of the time period just mentioned the reverse current transient decays rapidly in a roughly exponential manner. Since the extent of the reverse current transient is a function of the forward bias and the applied reverse voltage, its geometry can be readily adjusted according to the uses to which it is put. While the phenomenon of diode enhancement is observed in almost all semi-conductor diodes, it varies to a considerable extent from diode to diode and is particularly pronounced in junction diodes as opposed to point-contact units. In the practice of this invention, it is obviously desirable to select diodes which produce a large current transient when the applied voltage is reversed to the non-conducting direction.

According to the present invention, the enhancement phenomenon is applied to the control or switching of pulses of a given polarity by normally connecting a bias voltage across a semi-conductor element in the forward direction. A reverse pulse greater in amplitude than the bias will then pass. However, removal of the forward bias will prevent such reverse current action. The enhancement phenomenon may be applied to the controlling or switching pulses of either polarity flowing in either direction through the circuit. Two diodes are connected into a circuit path so that one diode presents a low forward impedance and the other, a high reverse impedance to signals in the path. A bias voltage is provided which may be connected to cause a like forward or a reverse bias voltage across each element of the path. When both diodes are biased to non-conduction, every signal is blocked by at least one of the diodes even if the signal is large enough to overcome the bias across the other. When both are biased to conduction, signals of either polarity of smaller current amplitude than that of the bias, in effect, pass through the diodes in substantially unaltered form. However, a larger signal cuts off the diode presenting a high reverse impedance thereto, but only after having passed a current pulse as a result of the diode enhancement phenomenon. The signal thus passed can be made to have sufficient amplitude and duration so that this method of switching pulses is suitable for many applications as will be noted in greater detail below.

It is accordingly an object of this invention to provide a new and improved pulse switching circuit.

It is a further object of this invention to provide a circuit using semi-conductor elements for switching pulses of large amplitude without requiring excessive application of continuous power.

It is a specific object of this invention to provide a practical pulse switching circuit whereby a number of loads, such as transducing heads associated with a magnetic drum, may share a single energizing circuit, such as a single writing circuit and a single reading amplifier.

It is another specific object of this invention to provide for a magnetic drum an electronic head switching circuit which switches both recording and playback pulses.

These and other novel features are set forth with particularity in the appended claims. The invention itself, however, may be best understood from the following description with reference to the accompanying drawings in which:

Figures 1A, 2, 3:
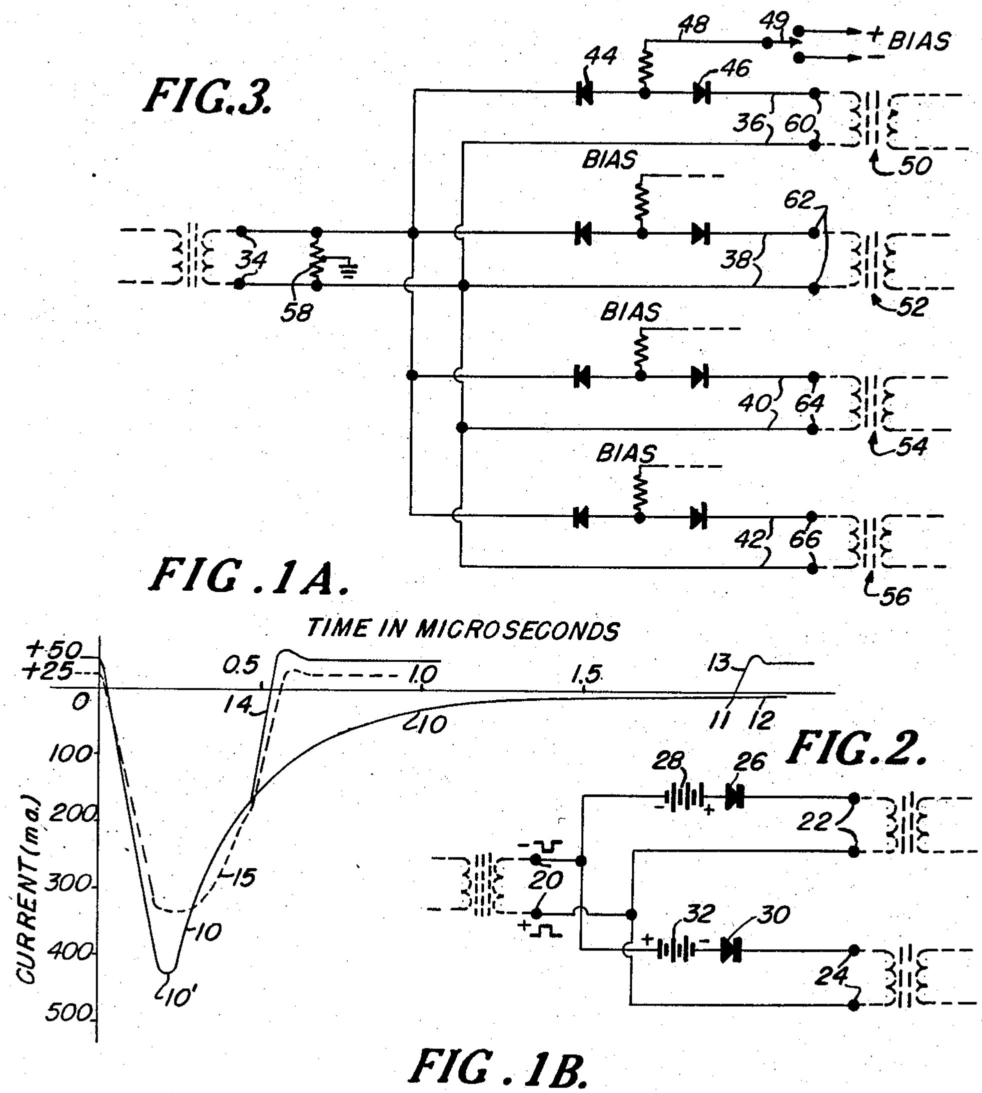
Figures 1A and 1B show waveforms resulting when reverse voltage is applied to a diode which exhibits the phenomenon of diode enhancement.
Figure 2 is a schematic diagram of pulse switching circuits illustrating the basic concepts of this invention.
Figure 3 is a schematic diagram of another arrangement of a circuit according to the invention.

Figure 1A is based upon a typical junction type diode in which the enhancement phenomenon is especially pronounced. This figure reflects the conditions which prevail after the diode is initially biased in the forward direction by a voltage sufficient to cause a current flow in the order of 50 ma. The zero point of the chart of Figure 1A represents the instant of reversal of the applied bias voltage. Curve 10, representing the current flow, swings down sharply at zero time and passes through zero current to become a reverse current having a peak 10' between 400 and 500 ma. The rise time of the reverse current transient is limited by circuit constants. In the circuit of Figure 1A the time lag for building up the reverse current transient to its maximum at point 10' is about 0.2 microsecond. Where the application of a pulse to be transmitted has caused the reversal in voltage, overcoming the forward bias voltage, so to speak, the pulse will be transmitted through the diode with a peak almost equal in amplitude to the reverse current. Accordingly, the diode is still essentially in its conductivity modulated state. The reverse current transient decays rapidly following the peak 10' and at a point 12 will be substantially less than 1 ma. after several microseconds. The point 11 in Figure 1A represents the time when the reverse voltage may be removed. At this time diode resumes its normally conducting state under the control of the forward bias voltage, and the forward bias current follows the curve 13.

Where the current to be switched is a pulse of short duration, the transmitted transient pulse will be almost the same shape as the applied reverse pulse as shown by waveform 14 produced from a one-half microsecond pulse. As will be demonstrated below, a pulse having the waveform 14 may be conveniently utilized in a number of situations.

To pass a given reverse current pulse through the diode without substantial attenuation as, for instance, waveform 14 of Figure 1A, the forward biasing current must exceed some minimum value. If the forward bias is reduced to 25 ma., the transmitted transient current produced by an applied reverse pulse of 500 ma. reaches a peak of only about 350 ma. as demonstrated by dash-line waveform 15. It should again be noted that the rise time is limited by the circuit constants so that the peak of the pulse is reached as before in about 0.2 microseconds.

As the applied reverse voltage is reduced, the biasing current may also be reduced without increasing the degree of attenuation. But a reverse current of 500 ma. (as in the example above) through the diode when biased with forward current of only 15 ma. (compared to the 25 ma. used above) may produce a transient like waveform 16 of Figure 1B, the peak value of which is reduced to about 300 ma. However, reduction of the applied reverse current to 150 ma. while maintaining the bias at 15 ma. may result in a transmitted transient current of almost 150 ma. peak value as shown by curve 17. As the applied reverse current is further decreased, the current transient approaches the shape of the applied pulse, and for an applied reverse current of 50 ma. (bias remaining at 15 ma.) the shape of the transient becomes essentially flat (waveform 18) for about one microsecond with virtually no attenuation during that period of time. Hence, by applying the reverse current for only one microsecond, a virtual square wave of waveform 18 may pass through the diode. The ability to produce such a pulse can be of considerable value in certain applications.

It will be appreciated that the geometry of the transmitted transient current pulse may be adjusted to a considerable extent by varying the biasing current and the amplitude and duration of the applied reverse current. Ordinarily, it is desirable to hold the biasing current low to avoid undue power dissipation, but it may also be impractical to build up the applied reverse current above a certain value. The values chosen for each will be to a large extent the result of compromise.

Figure 1B:
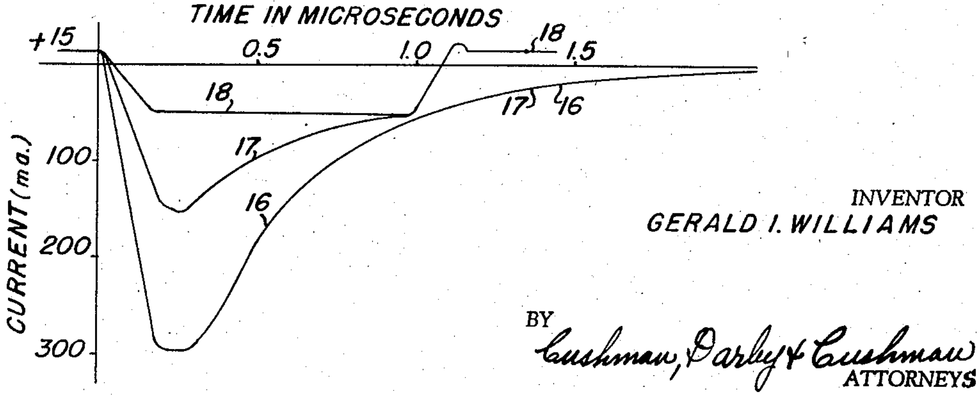

While the waveforms of Figures 1A and 1B were taken with a junction-type diode, any rectifier element which exhibits the phenomenon of diode enhancement to a substantial extent is suitable for use in this invention with preference logically being extended to diodes which produce maximum reverse current transients so that power losses are held to a minimum.

Diode switching circuits whereby pulses may be switched between a first line and one of several lines (or vice versa) either in the conventional sense and/or by using diode enhancement, are shown in Figures 2 and 3. Figure 2, however, particularly illustrates the invention as it may be applied to switching of unipolar pulses, while Figure 3 shows exemplary circuitry for the switching of bipolar pulses.

In Figure 2, signals arriving at terminals 20 and having a polarity whereby the lower of terminals 20 is more positive than the upper of terminals 20 will pass, regardless of their amplitude, to output terminals 22 and not to output terminals 24. This is because diode 26 is biased positively to conduction by battery 28, and even if a signal applied at terminals 20 is larger than, and opposed to, the forward current from battery 28, the applied signal will momentarily negatively bias diode 26 and cause the enhancement effect thereof which, as previously explained, effectively passes a transient current signal through the diode in a reverse direction. However, as illustrated, diode 30 is biased off by battery 32, and regardless of the amplitude or polarity of the signal arriving at terminals 20, no diode enhancement effect can take place in diode 30 nor can current pass therethrough in the conventional sense; therefore, there will be no signal at terminals 24.

In the event that batteries 28 and 32 were reversed in polarity (i. e., reversed from their illustrated polarization), signals from terminals 20 would then be switched to line 24 only.

The circuit of Figure 2 may also be utilized to switch pulses from either terminals 22 and 24 to terminals 20, for example, if the upper conductor of terminals 22 is momentarily more negative than the lower, as by a pulse applied thereto, the forward current through diode 26 will be opposed, and if the pulse is large enough, the bias across diode 26 is momentarily reversed. Therefore, the diode enhancement feature of diode 26 takes effect and a current transient is passed to terminals 20, while a similar pulse at line 24 would be blocked from passing diode 30 since it is biased in the reverse direction.

Figure 3 illustrates a diode switching circuit whereby pulses of either polarity may be switched between a first line having terminals 34 and any one of a group of lines 36, 38, 40 or 42 in the conventional sense and/or by using diode enhancement. Suppose that it is desired to switch pulses impressed on terminals 34 to line 36. Diodes 44 and 46 are biased in the forward direction by the application of a small positive voltage on line 48 with respect to ground, while the corresponding diodes of lines 38, 40 and 42 are biased in the reverse polarity. This biasing may be through control devices such as switches, tube circuits, etc. without limitation. As an example, a switch 49 is located in each circuit for determining the bias. By completing the D. C. paths across the terminals of lines 36, 38, 40 and 42 with inductors or transformers 50, 52, 54 and 56 and by providing a grounded center tap on resistor 58, the biasing currents through diodes 44 and 46 are equal. Signals of either polarity arriving at terminals 34 having a current amplitude lower than that flowing in diodes 44 and 46 pass through said diodes to terminal 60 substantially unattenuated whereas the corresponding diodes in lines 38, 40 and 42 present a high impedance to block the signals. A negative signal applied to terminals 34 (that is, a signal causing the upper of terminals 34 to be negative with respect to the lower terminal) will cause the current in diode 44 to increase, but will cause the current in diode 46 to decrease. If the amplitude of the current produced by the applied negative signal exceeds the steady state bias current in diode 46, the enhancement phenomenon permits a reverse current flow in this diode with very little attenuation for an initial short time. As shown above in connection with Figures 1A and 1B, this pulse may be sufficiently well defined to be used in numerous electronic applications. Positive signals arriving at terminals 34 (the upper terminal being more positive than the lower terminal in this case) will cause an inverse effect in which the enhancement of diode 44 may be utilized. It will be appreciated that signals arriving at terminals 60, 62, 64, 66 may be selectively transmitted to terminals 34 in the same manner.

If it is desired to pass signals using a negative switching biasing potential at points 48 and the like, it is only necessary to reverse the connections to every diode in Figure 3, and the switch will retain its bi-directional property.

In view of the ability to transmit the pulses in both directions through the circuits, it is convenient to term the ends of the circuits "pulse transfer points."

Figure 4:
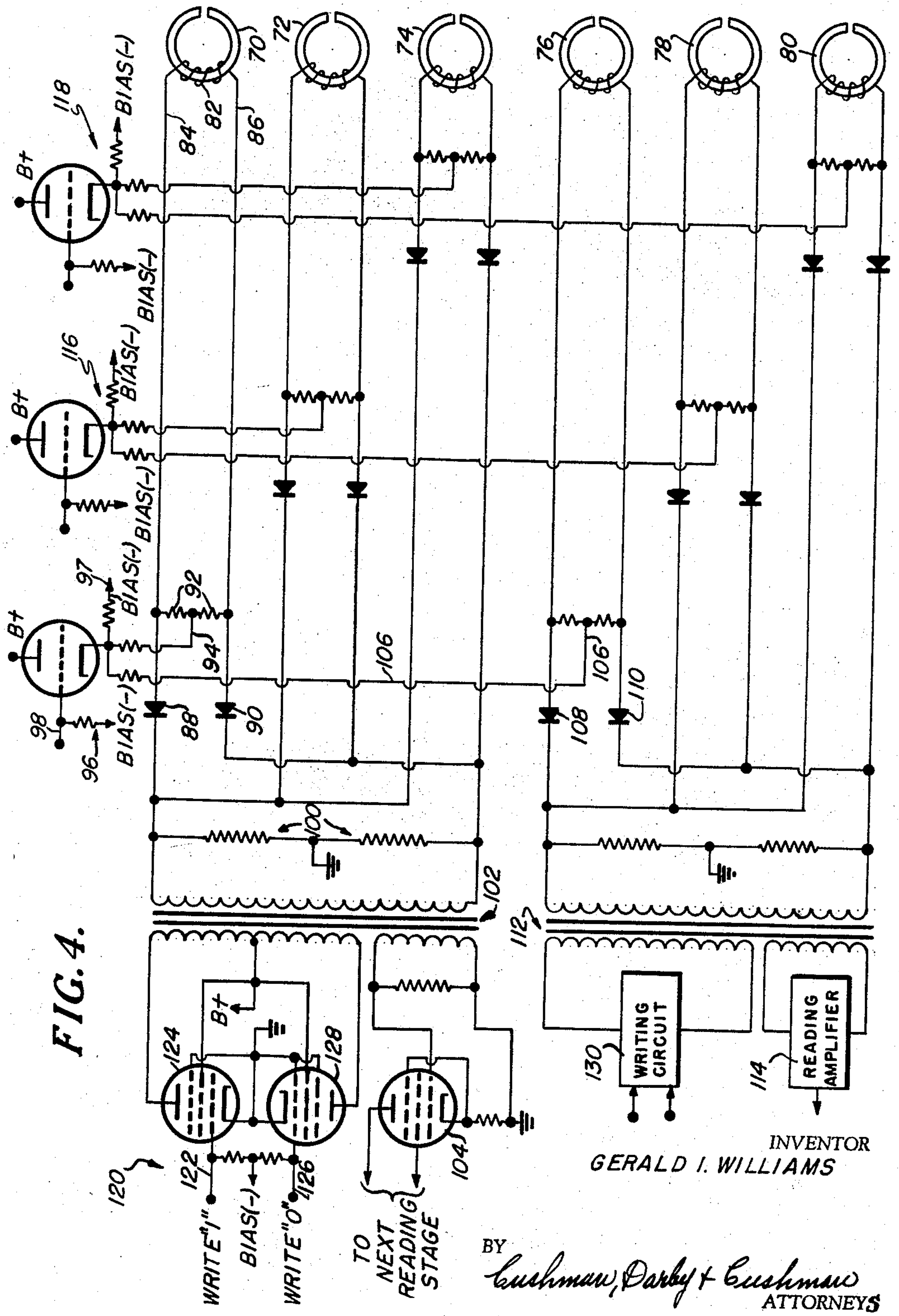
Figure 4 is a schematic diagram of a magnetic transducer switching system according to the invention.

Reference is now made to Figure 4 to show the inclusion of bias switching means in circuits of this invention as described above. The description is in terms of the switching of transducing heads of a magnetic drum so that a number of heads may share a writing circuit and a reading amplifier. Figure 4 illustrates the parallel operation of two sets of three transducing heads. Heads 70, 72, 74 are grouped in a first set and heads 76, 78, 80 in a second set with one head in each set operating (either recording or reading) simultaneously. While the heads are symbolically represented by circular core pieces, it will be appreciated that this invention may be used with any magnetic transducing head which is capable of responding to very short pulses, e. g., 0.5 microsecond pulses. The head should be provided with a single read-write winding as winding 82 of head 70 if a single switch is to control both recording and playback operations.

Each lead 84, 86 from winding 82 of head 70 is provided with a diode 88, 90, which diodes exhibit the enhancement phenomenon. Diodes 88 and 90 are preferably identical and for suitable operation possess the property of diode enhancement to substantially the same degree. Leads 84 and 86 are interconnected by center tapped resistor 92, the tap lead 94 of which connects to cathode follower circuit 96. The negative bias applied at point 97, in the absence of conduction of cathode follower 96, maintains lead 94 negative, and consequently places a reverse bias upon diodes 88 and 90. However, when cathode follower 96 is made to conduct by the application of a selecting voltage on grid line 98, lead 94 moves positive and causes current to flow through diodes 88 and 90 and the two halves of center tapped resistor 100 to ground, biasing both diodes 88 and 90 to conduction. Since signals played back from the magnetic drum through head 70 are very small, being measured in millivolts, the positive biasing current through diodes 88 and 90 may be quite small although it is preferably held in the order of several milliamperes so that diodes 88 and 90 offer a low impedance to the playback signals. Accordingly, these signals, regardless of their polarity or amplitude, are switched virtually without attenuation to transformer 102 (in the conventional sense and/or by utilizing the enhancement feature of the diodes) and therethrough to the first stage 104 of a reading amplifier. Suitable reading amplifiers are illustrated and described in United States Patent 2,614,169 issued October 14, 1952 to A. A. Cohen et al. and in United States patent application Serial No. 431,108, filed May 20, 1954 by John L. Hill. The conduction of cathode follower 96 also causes line 106 to go positive to bias both diodes 108 and 110 to conduction so that signals read by head 76 go to transformer 112 in the same manner as above described, and to reading amplifier 114, which is identical to the reading amplifier 104 provided for the first set of heads. If cathode followers 116 and 118 are non-conducting, signals played back from the drum through heads 72, 74, 78, 80 are blocked by the diodes in their respective leads. Hence, to energize one pair of heads it is only necessary to bring the corresponding cathode follower to conduction while leaving the other cathode followers in the off state.

To record signals on the drum through heads 70, 72, 74, a high speed writing circuit 120 is connected to transformer 102. A signal from the data handling equipment (not shown) to "write 1" appears on line 122 as a short positive pulse to momentarily bring pentode 124 to conduction. As an example, assume recording is to be done by head 70 by causing tube 96 to conduct and bias diodes 88 and 90 in the forward direction. Then, to the resultant output from transformer 102, one of diodes 88, 90 presents a low forward impedance while the other is switched to the non-conducting state, but during its recovery time it passes a high percentage of the pulse current in accordance with the above explained diode enhancement phenomenon. In an actual embodiment, by subjecting diodes 88 and 90 each to a biasing current flow of about 25 ma. and drawing a pulse of 500 ma. from transformer 102 for about 0.5 microsecond, a current pulse is applied to head 70 which is sufficient to alter the state of magnetization of the adjacent portion of the surface of the drum to the arbitrarily designated "1" polarity. This assumes that the diodes associated with heads 72 and 74 are biased off. The current pulse takes the form of curve 15 of Figure 1A.

Since the pulse drawn from transformer 102 and accordingly the pulse applied on the line 122 may be of very short duration, i. e., 0.5 microsecond, the "write 1" pulse may be a "clock" or "sprocket" pulse such as is generally present in electronic data handling systems for timing purposes. If it is desired to "write 0," the clock pulse is applied to lead 126 to bring pentode 128 to conduction. This produces an output from transformer 102 of opposite polarity so that the roles of diodes 88 and 90 are reversed, and the transmitted current pulse causes a magnetic spot in the arbitrarily designated "0" polarity to be recorded on the drum. To write with heads 70 and 76 simultaneously, it is only necessary to apply the timing pulse simultaneously to the corresponding pentode of writing circuit 130. By bringing cathode follower 116 to conduction and cutting off followers 96 and 118, signals from writing circuits 120 and 130 are respectively applied to transducing heads 72 and 78, and signals played back by those heads are applied to reading amplifiers 104, 114.

It will be appreciated that the enhancement characteristics of a diode may be matched to the amplitude and duration of the signal currents which are to be switched. A simple means of providing this compatability is to alter the number of turns on the participating transformers and transducers (magnetic heads) to provide an optimum relationship.

While this invention has been specifically illustrated with reference to the recording and playback of digital information on magnetic drums, it will be appreciated that it may be used in many pulse switching applications. For instance, it may be used in conjunction with other data storage facilities such as an array of magnetically saturable elements or with other magnetic recording surfaces such as tapes or discs. Each pair of semi-conductive elements may in certain cases be placed in the same lead as in Figure 3, but they must often be used symmetrically as in the circuit of Figure 4; for example, in a head switching system the single lead construction would cause a steady current to flow through the transducer windings to eventually erase the magnetic surface. Many similar modifications and numerous other applications could be made by one skilled in the art without departing from the concepts of the invention. Therefore, it is intended that the matter contained in the foregoing description be interpreted as illustrative and not limitative, the scope of the invention being determined from the appended claims.

What is claimed is:

1. In a pulse circuit, a circuit path having a first pulse transfer point and a second pulse transfer point, a semi-conductor rectifier element demonstrating the enhancement phenomenon connected in said path, and bias means connected with the element applying a predetermined forward bias voltage across the element and therefore causing a predetermined forward bias current to flow through said element, the arrangement being such that a voltage pulse applied to one of said pulse transfer points and across said element of magnitude greater than and opposite to said forward bias will cause reverse current flow through said element due to the enhancement phenomenon to faithfully transmit said applied pulse to the other of said pulse transfer points.

2. A circuit as in claim 1 and further including means for applying a reverse bias voltage across said element for suppressing transmission of said pulse through said circuit.

3. In a pulse circuit, a circuit path having a first pulse transfer point and a second pulse transfer point, two semi-conductor rectifier elements each demonstrating the enhancement phenomenon connected in series and in opposition in said path, and bias means connected with the elements applying a predetermined forward bias voltage across each element and therefore causing a predetermined forward bias current to flow through both elements, the arrangement being such that a voltage pulse applied to one of said pulse transfer points and across said elements of magnitude greater than and opposite to the forward bias across one of the elements will cause reverse current flow through said one element due to the enhancement phenomenon with the result that a voltage pulse of either positive or negative polarity of said greater magnitude applied to either one of the pulse transfer points will be faithfully transmitted to the other of said pulse transfer points.

4. A circuit as in claim 3 and further including means for selectively applying a reverse bias voltage across the elements for suppressing transmission of pulses through said circuit.

5. A circuit as in claim 3 wherein the elements are both in the same side of the path and the bias means includes a source of biasing potential one side of which is connected to a point in said side of the path between the elements and the other side is connected to a mid-tap of an impedance connected across the path beyond the elements.

6. A circuit as in claim 1 wherein the bias means includes a source of potential connected in said path in series with said element.

7. A circuit as in claim 3 wherein one element is in one side of the path, the other element is in the other side of the path, and the bias means includes a source of bias potential one side of which is connected to the mid-tap of an impedance across the path to one side of the elements and the other side of which is connected to the mid-tap of an impedance across the path to the other side of the elements.

8. In a pulse switching circuit, a plurality of circuit paths having a first pulse transfer point in common and each circuit path having a second pulse transfer point, each circuit path having two semi-conductor rectifier elements each demonstrating the enhancement phenomenon connected in each path, bias means for each path connectable with the two elements in each path for applying a predetermined forward bias voltage across each element in each path and therefore causing a predetermined forward bias current to flow through each element when said forward bias voltage is applied, means for selectively connecting one or more of said bias means for applying said forward bias voltage to one or more of the pairs of elements in each path to be enabled and for applying a reverse bias across the remaining elements, the arrangement being such that a voltage pulse of positive or negative polarity and of magnitude greater than and opposite to the forward bias across the elements of any path to which said bias is connected applied to one of the pulse transfer points of each path to which bias voltage is applied will cause reverse current flow through one of said elements due to the enhancement phenomenon to faithfully transmit said applied pulse to the other of said pulse transfer points in each path to which said bias voltage is applied.

9. In a pulse switching circuit for selectively enabling a plurality of electromagnetic transducing devices, a plurality of circuit paths having a pulse transfer point in common at one end thereof and each circuit path at the other end thereof being operatively connected to one of said transducing devices, each circuit path having two semi-conductor rectifier elements each demonstrating the enhancement phenomenon connected in each path, bias means for each path connectable with the two elements in each path for applying a predetermined forward bias voltage across each element in each path and therefore causing a predetermined forward bias current when the bias means is connected, means for selectively connecting one or more of said bias means for applying said forward bias voltage to one or more of the pairs of elements in each path to be enabled and for applying a reverse bias across the elements of paths to be suppressed, the arrangement being such that a voltage pulse of positive or negative polarity and of magnitude greater than and opposite to the forward bias across the elements of any path to which said bias is connected, applied to the common pulse transfer point or generated in a transducing device in a path to which bias voltage is applied, will cause reverse current flow through one of said elements due to the enhancement phenomenon to faithfully transmit said pulse through each path to which said bias voltage is applied.

10. A circuit as in claim 9 wherein the bias connecting means includes a cathode follower circuit for each of said circuit paths, with a connection from the cathode follower to the mid-tap of a resistor across the circuit path to one side of the elements, the cathode followers being controllable to move said mid-tap between said forward bias voltage and said reverse bias voltage.

11. A circuit as in claim 9 wherein the common pulse transfer point of each path includes the secondary winding of a transformer, said transformer having at least one primary winding connected to a pulse generating circuit having at least one other primary winding to a pulse receiving circuit.

References Cited in the file of this patent

UNITED STATES PATENTS

| | | |
|---|---|---|
| 2,611,025 | Jankowski | Sept. 16, 1952 |
| 2,695,398 | Anderson | Nov. 23, 1954 |